Patented Dec. 27, 1949

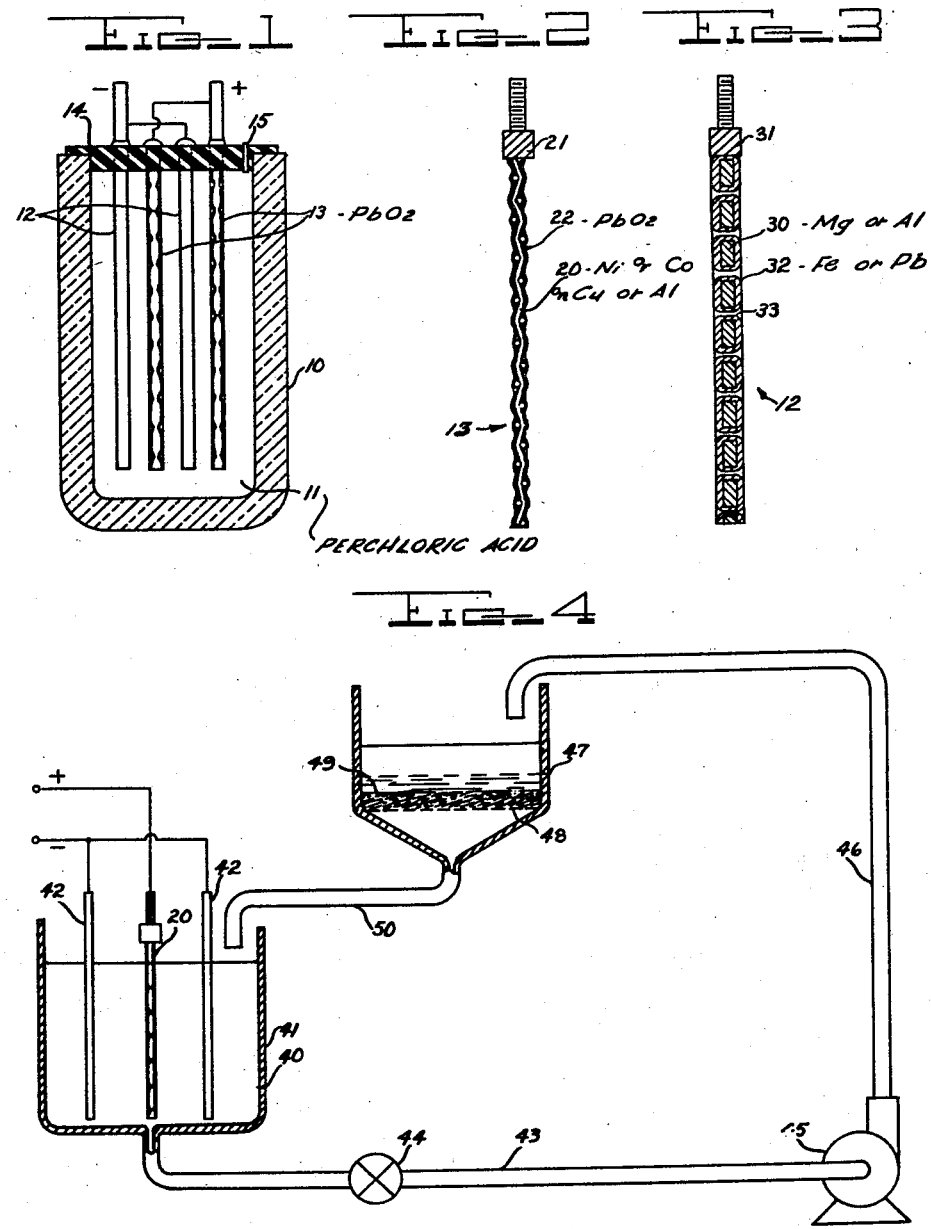

2,492,206

UNITED STATES PATENT OFFICE 2,492,206

LEAD PERCHLORIC ACID PRIMARY CELL

Joseph C. White, University Park, Md., John H. Baldwin and Edward J. Peebles, Washington, D. C., and Wilson H. Power, Greenbelt, Md.

Application January 19, 1943, Serial No. 472,830

1 Claim. (Cl. 136—100)

(Granted under the act of March 3, 1883, as amended April 30, 1928; 370 O. G. 757)

This invention relates to electric batteries, and it is particularly concerned with the manufacture of a primary cell capable of high current output at low temperatures.

The most commonly used heavy duty battery is the usual sulfuric acid-lead storage cell. Cells of this type, as well as various primary cells, have been made which produce high currents for considerable periods of time, and they are capable of producing extremely high currents for short periods, known as "flash currents." It is this ability to furnish flash currents of high intensity (and high power due to low internal resistance) which has permitted the use of battery power for moving or operating fairly large engines, such as starting a gasoline engine and various mechanisms of ordnance.

However, these cells or batteries are not nearly so useful at very low temperatures, and sustained flash currents cause the available voltage to drop sharply. Also they are quite heavy in relation to the current output available. The drop in available current is particularly noticeable at temperatures below about −10° C., and the current output at, say, −40° C. is usually of the order of a few percent of the room temperature maximum. A new type of cell has recently been developed for operation at low temperatures such as are encountered in the use of radio-sonde apparatus. This cell is very light weight and compact, and its output at room temperature is more than that of similar cells now on the market. It is characterized by the relatively slight drop in output at temperatures as low as −40° C., and a really useful output at temperatures as low as −60° C., where commercial cells cease to function. Like the sulfuric acid storage cells this cell has a lead negative plate and a lead dioxide positive plate, but it differs from conventional cells in employing aqueous perchloric acid as the electrolyte. This cell is described and claimed in the Schrodt and Craig application, Serial No. 424,160, filed December 23, 1941. As described therein, the lead dioxide is supported by a noble metal such as gold, platinum or tantalum, and palladium is preferred. The reason for not using a lead support for the lead dioxide as is done in sulfuric acid batteries is because the dioxide layer is porous and the perchloric acid attacks the metal underneath.

This invention is concerned, not with the small, light weight cells suitable for radio-sonde equipment, but with batteries capable of extremely high, sustained flash currents, even at low temperatures; that is, batteries which will deliver a relatively enormous amount of power for a short period of time under almost any conditions. In this respect the invention is a modification of the radio-sonde type of battery disclosed in the Schrodt and Craig application referred to above.

Accordingly, this invention provides a battery of the perchloric acid-lead type which is characterized by its lightness and smaller size when compared to the standard sulfuric acid-lead cells of equivalent power, and is capable of delivering exceedingly high currents at low temperatures without excessive loss of voltage. The invention also contemplates specially designed positive and negative plates, or electrodes, which may be made cheaply by the method herein disclosed, and combinations of positive and negative plates which are especially adapted to the production of higher cell voltages and currents under adverse operating conditions.

The battery, or cell, of this invention utilizes perchloric acid as the electrolyte and lead dioxide as the positive electrode, and the negative electrode comprises one or more metals selected from the group consisting of magnesium, aluminum, manganese, zinc, iron, cadmium, tin and lead. The electrode need not be the pure metal, and in fact alloys of these metals with various other metals are useful, depending on the particular use for which the cell is designed. Particularly useful for high flash currents with sustained voltages is a negative electrode comprising an aluminum grid coated with lead, as hereinafter described.

In order to obtain a high capacity cell it is necessary to construct fairly thick electrodes of large surface area. It is prohibitive to make such electrodes of noble metals, so that the lead dioxide must be supported on some other conducting material, such as carbon or certain metals, on which it can be deposited in an adherent condition and which is not attacked appreciably by the constituents of the cell.

Very few metals other than the noble metals do not produce strong couples with lead dioxide in perchloric acid solution. On such relatively inactive metals, or alloys as nickel, chromium, stainless steel, cobalt, or iron, or on carbon, however, the lead dioxide can be deposited in a strong, dense, adherent layer which will not decompose rapidly in contact with perchloric acid solution. However, metals which produce strong couples can be used as grid materials for the positive plate if first plated with a relatively inactive metal such as nickel or cobalt. Perforated copper or aluminum sheet, or wire screen, plated with nickel, are preferred as supports for the lead dioxide.

The layer of lead dioxide may be obtained on the nickel surface in several ways, but the most practical method comprises electrodepositing the lead dioxide on the nickel from a lead nitrate bath. However, it is necessary to control the pH of the bath within rather narrow limits if a dense, adherent layer is to be obtained on the nickel. In general the pH should be maintained within the range of about 5 to 2, and this is most easily accomplished by circulating the lead nitrate solution (containing nitric acid formed by the electrolysis) through a filter bed of lead oxide or carbonate, or other basic lead compound, and returning the filtrate, enriched with lead, to the plating bath.

In order that the invention may be clearly understood typical embodiments thereof are described with reference to the accompanying drawing, in which:

Fig. 1 is a cross-sectional view of a complete cell made in accordance with the invention;

Fig. 2 is a cross-sectional view of one form of positive electrode for use in the cell of Fig. 1;

Fig. 3 is a cross-sectional view of a negative electrode which may be used in the battery of Fig. 1; and Fig. 4 is a schematic diagram of the method of preparing the positive electrode.

Referring to Fig. 1, the cell comprises a container 10 of glass or synthetic resin partially filled with aqueous perchloric acid 11 in which are immersed negative electrodes 12 and positive electrodes 13, supported in position by a brace 14. A vent 15 is provided to permit the escape of gas. The negative electrodes 12 may be any of the metals or alloys mentioned above, and they may be of any shape desired, preferably not too thin because they are consumed during use. The positive electrodes 13 comprise a conductive support (e. g. metal or carbon), nickel plated, and bearing a coating of lead dioxide.

The preferred design of positive plate is shown in Fig. 2 in which a copper or aluminum wire screen grid 20 is soldered, clamped or otherwise fastened to a metal holder 21. The screen 20 bears a thin coating of nickel or cobalt, which may be advantageously electrodeposited according to standard practice, preferably from a nickel or cobalt sulfate bath or other solution which will give a bright deposit. The nickel plated screen 20 carries a dense, firmly adherent layer of lead dioxide 22. The lead dioxide layer 22 is prepared on the screen 20 by electrolysis of lead nitrate, as described in connection with Fig. 4. If desired a carbon grid may be used in place of the copper or aluminum, in which case the nickel plating may be omitted and the lead dioxide deposited directly on the carbon.

In Fig. 3 is shown a cross-sectional view of one form of negative electrode which is useful in the battery of this invention where it is desirable to maintain the highest possible voltage toward the end of the discharge, at very high currents. This is accomplished by presenting a less active metal to the electrolyte during the first part of the discharge, at which time the electrolyte is strongest, and then exposing a more active metal toward the end of the discharge. In this way it is possible to utilize the high voltage obtainable from a metal so active that it would readily dissolve in the perchloric acid by displacement of hydrogen, without excessive loss of metal in this manner. In the figure, a perforated sheet or grid 30 (which may equally well be a wire screen) is fastened to a metal holder 31, in the same manner that the grid 20 is fastened to the holder 21 in Fig. 2. The grid 30 is made of one of the more active metals in the group of metals indicated above as suitable negative electrode material, such as magnesium or aluminum, and it is plated or otherwise coated with a less active metal 32, such as iron or lead. During discharge of the battery the less active metal 32 is consumed until, toward the end of the discharge, the grid 30 becomes exposed to the electrolyte at various points, such as at 33, and the cell voltage is sustained or even raised. This may be due, in part, to the higher potential between the positive electrode and the more active metal, and it may be due in part to the displacement of some of the already dissolved, less active metal from the electrolyte, but the precise mechanism of the reaction which takes place and sustains the cell voltage is not known. The important fact is that the cell voltage, and hence power output, may be sustained or even increased by this method where extremely high currents are demanded for a relatively short period of time.

Referring to Fig. 4, the nickel plated screen 20, of Fig. 2, is immersed in an aqueous solution of lead nitrate 40 in a container 41, and the screen 20 is connected to the positive side of a source of direct current. Also immersed in the solution 40 are two electrodes 42, which may be made of copper, carbon, or other conductive material. These electrodes are connected to the negative side of the source of direct current. On flow of current through the solution 40, metallic lead is deposited on the electrodes 42 and lead dioxide is deposited on the screen 20. As the solution 40 becomes depleted of lead, the hydrogen ion concentration, or acidity, rises, due to formation of nitric acid. If the acidity rises very much the lead dioxide deposit will not be adherent. Therefore the solution 40, along with spongy lead droppings from the electrodes 42, is drawn from the bottom of the container 41 through a conduit 43, controlled by a valve 44, to a pump 45. The pump 45 lifts the solution 40 through a conduit 46 into a container 47 having a porous bottom 48 covered by a thick layer of an insoluble basic lead salt 49, such as lead oxide or lead carbonate. The solution 40 filters through the layer 49, leaving the spongy lead droppings, and the nitric acid in the solution 40 reacts with the lead salt to form more lead nitrate. From the layer 49 the lead-enriched solution 40, of low acidity, returns through a conduit 50 to the container 41 for further use. In practice it has been found that the solution 40 may be reused for an almost unlimited time, when regenerated as above described, thus indicating that the decomposition of the nitric acid to oxides of nitrogen is extremely small. However, there is some lead nitrate loss from adherence to plates removed from the bath, known as "drag out," and this is replaced by periodical additions of lead nitrate to the bath.

The concentration of lead nitrate in the solution 40 is not critical, excellent results being obtained with a concentration of about 200 to 500 grams per liter, preferably about 275 grams per liter, with no free nitric acid added. Sometimes trouble is encountered with lead treeing from the electrodes 42. This can be prevented by adding a small amount of a copper salt to the solution 40, but after operation has been started the copper salt is not necessary, apparently due to solution of a small amount of nickel from the screen 20. The current density is not critical in depositing the lead dioxide, but the densest and strongest deposit is obtained with a current density within the range of about 30 to about 300 amperes per square foot, with 65 to 125 amperes per square foot preferred. The temperature of the bath will rise during operation, but a good deposit is obtained anywhere from room temperature to about 60° C. However, high temperatures should be avoided to prevent cracking of the brittle lead dioxide coating after coming to room temperature.

The following examples illustrate typical results obtained with various combinations of electrodes according to the invention.

*Example 1*

A 14 mesh iron screen was iron-plated to obtain a pure iron surface. The total area of the screen (cut into two plates) was about 294 square inches, and it served as the negative pole of the cell.

A 16-mesh copper screen, nickel-plated, was used as the support for the lead dioxide which was deposited on the screen in the manner described with reference to Fig. 4. It had a total area (two plates) of about 279 square inches, and it formed the positive pole of the cell.

On placing the positive and negative plates in a 40% aqueous solution of perchloric acid the cell was discharged at a constant rate of 85 amperes for a period of seven minutes. During the discharge the voltage dropped from 1.36 to 1.32 volts.

Although the voltage obtained with an iron negative pole is lower than that obtained with some other metals it is remarkably constant at such a high rate of discharge.

*Example 2*

A 16-mesh copper wire screen was cadmium plated to provide two negative plates (i. e. one pole) having a total area of about 186 square inches. The positive pole of this cell was identical to the one described in Example 1, and the concentration of perchloric acid was also the same.

When this cell was discharged at a current of 85 amperes for seven minutes the voltage dropped from 1.72 to 1.40 volts.

*Example 3*

A perforated aluminum sheet was plated with a thin coat of nickel and then plated with a heavy deposit of lead dioxide in the manner described with reference to Fig. 4. This plate was used as the positive pole of the cell and had a total area of about 45 square inches. Two sheets of lead were placed in the cell on either side of the positive pole and connected together to form a negative pole with a total area of about 69 square inches.

This cell was discharged at a constant current of 50 amperes for 9 minutes, during which time the voltage dropped from 1.70 to 1.42 volts.

*Example 4*

A perforated aluminum sheet, nickel plated, was used as the support for the lead dioxide which was deposited in the manner described with reference to Fig. 4.

The negative plates were two similar perforated aluminum plates which had been sprayed with lead.

Both poles had areas of about 42 square inches.

When this cell was discharged, using 60% perchloric acid electrolyte, at a constant current of 85 amperes, the initial potential of 1.59 volts dropped slowly to 1.34 in four minutes and then rose to 1.58 volts in the next three minutes.

The concentration of perchloric acid in the cell is not critical. For practical reasons it is not desirable to exceed about 71%, as at this concentration the perchloric acid forms an azeotropic mixture with water and also the degree of ionization is less. Extremely weak acid is undesirable because it obviously will not provide a vigorous cell reaction. For general operation and especially very low temperature operation, a concentration of about 50% is generally preferable because at this concentration the freezing point is lowest and conductivity highest. Also for very low temperature operation magnesium may be used to advantage in the construction of the negative pole, whereas it is somewhat too active for practical use at room temperatures.

Where weight is a primary consideration both electrodes may be made of aluminum, nickel coated for support of the lead dioxide to form the positive pole, and with one of the less active metals indicated for the negative pole. As with magnesium, aluminum alone may be advantageously used as the negative pole for low temperature work, although it is also useful at room temperatures, particularly where it bears a "starting" coat of a less active metal.

Other advantageous combinations of metals for the negative electrode are aluminum or magnesium coated with cadmium or iron, and zinc coated with cadmium, tin or lead.

Many variations will be apparent to those skilled in the art and the invention should not be limited other than as defined by the appended claim.

The invention described herein may be manufactured and used by or for the Government of the United States of America for governmental purposes without the payment of any royalties thereon or therefor.

We claim:

A primary cell characterized by its high flash current and efficiency at low temperature comprising a positive electrode consisting of a cobalt-coated aluminum support bearing a coating of lead dioxide, an electrolyte consisting of a solution of perchloric acid and a negative electrode consisting of aluminum coated with lead.

JOSEPH C. WHITE.
JOHN H. BALDWIN.
EDWARD J. PEEBLES.
WILSON H. POWER.

REFERENCES CITED

The following references are of record in the file of this patent:

UNITED STATES PATENTS

| Number | Name | Date |
|---|---|---|
| 368,190 | Case | Aug. 16, 1887 |
| 396,769 | Sellon | Jan. 29, 1889 |
| 408,367 | Aldrich | Aug. 6, 1889 |
| 441,959 | Kennedy | Dec. 2, 1890 |
| 759,065 | Betts | May 3, 1904 |
| 773,961 | Morgan | Nov. 1, 1904 |
| 900,502 | Ferchland et al. | Oct. 6, 1908 |
| 1,425,163 | Bardt | Aug. 8, 1922 |
| 1,826,724 | Booss et al. | Oct. 13, 1931 |

FOREIGN PATENTS

| Number | Country | Date |
|---|---|---|
| 18,036 | Great Britain | 1895 |
| 456,082 | Great Britain | Nov. 3, 1936 |

OTHER REFERENCES

Vinal, G. W.: Storage Batteries, 2nd ed. (1930), page 148.

Schrodt et al.: N. B. S. Battery for Low Temperature Operation, P. B. 27276 (O. S. R. D. 558), pages 2 to 6. Report dated Aug. 18, 1941.